(12) United States Patent
Becker et al.

(10) Patent No.: US 12,300,950 B2
(45) Date of Patent: May 13, 2025

(54) INTERNALLY SPRUNG SHUNT

(71) Applicant: Conductix, Inc., Omaha, NE (US)

(72) Inventors: John M. Becker, Omaha, NE (US); Jonathon D. Smith, Omaha, NE (US); Martin Blair, Gretna, NE (US)

(73) Assignee: CONDUCTIX, INC., Omaha, NE (US)

( * ) Notice: Subject to any disclaimer, the term of this patent is extended or adjusted under 35 U.S.C. 154(b) by 385 days.

(21) Appl. No.: 17/719,058

(22) Filed: Apr. 12, 2022

(65) Prior Publication Data
US 2022/0329027 A1 Oct. 13, 2022

Related U.S. Application Data

(60) Provisional application No. 63/173,607, filed on Apr. 12, 2021.

(51) Int. Cl.
*H01R 39/36* (2006.01)
*H02J 7/00* (2006.01)

(52) U.S. Cl.
CPC ............ *H01R 39/36* (2013.01); *H02J 7/0045* (2013.01)

(58) Field of Classification Search
CPC ........ H01R 39/36; H02J 7/0045; Y02T 10/70; Y02T 10/7072; Y02T 90/14
USPC ......................................................... 439/32
See application file for complete search history.

(56) References Cited

U.S. PATENT DOCUMENTS

| | | | | |
|---|---|---|---|---|
| 2,982,938 A | * | 5/1961 | Klumpp, Jr. | H01R 4/2495 439/423 |
| 3,170,080 A | * | 2/1965 | Shetterly | H01R 39/383 310/249 |
| 3,281,520 A | * | 10/1966 | Rocard | H01R 4/66 361/216 |
| 3,443,021 A | * | 5/1969 | Schrader | H01F 6/06 427/63 |
| 3,564,168 A | * | 2/1971 | Bigg | H01R 39/00 200/275 |

(Continued)

FOREIGN PATENT DOCUMENTS

| | | |
|---|---|---|
| KR | 20080038182 A | 5/2008 |
| KR | 20180104487 A | 9/2018 |
| KR | 20200142780 A | 12/2020 |

OTHER PUBLICATIONS

International Search Report and Written Opinion for Application No. PCT/US2022/024446, dated Aug. 9, 2022.

*Primary Examiner* — Alexander Gilman
(74) *Attorney, Agent, or Firm* — Ryan T. Grace; Advent, LLP (57) ABSTRACT

A shunt for a charging contact assembly may include an elongate elastic support substrate and a conductor disposed of the elongate elastic support substrate for transferring electrical current. A charging contact assembly may include a connector to connect to a source of electrical energy for receiving electrical current and a brush coupled with the connector for contacting a conducting surface to transfer the electrical current. The charging contact assembly may also include a shunt fixedly connected to the connector and the brush for transferring the electrical current from the connector to the brush, where the shunt includes an elongate arcuate elastic support substrate fixedly connected to the connector and the brush, and a conductor disposed of the elongate arcuate elastic support substrate and extending between the connector and the brush.

14 Claims, 11 Drawing Sheets

(56) References Cited

U.S. PATENT DOCUMENTS

| | | | | |
|---|---|---|---|---|
| 4,336,420 A * | 6/1982 | Benz | | H01B 12/02 |
| | | | | 174/15.5 |
| 4,384,168 A * | 5/1983 | Kenney | | H01F 6/06 |
| | | | | 174/117 FF |
| 4,533,798 A * | 8/1985 | Yatchum | | H01R 35/02 |
| | | | | 200/11 R |
| 4,551,646 A * | 11/1985 | Brown | | H01R 39/41 |
| | | | | 310/145 |
| 4,996,507 A * | 2/1991 | McKee | | H01H 77/107 |
| | | | | 335/147 |
| 5,154,646 A * | 10/1992 | Shoup | | H01M 50/522 |
| | | | | 439/502 |
| 5,302,886 A * | 4/1994 | Jacobsen | | G01B 7/003 |
| | | | | 200/11 R |
| 5,360,949 A * | 11/1994 | Duxbury | | H01B 7/0861 |
| | | | | 174/250 |
| 5,457,368 A * | 10/1995 | Jacobsen | | G01P 15/124 |
| | | | | 200/11 R |
| 6,039,075 A * | 3/2000 | Jacobsen | | F16K 7/18 |
| | | | | 251/901 |
| 6,518,521 B1 * | 2/2003 | Marek | | G11B 5/4806 |
| | | | | 200/16 D |
| 6,936,994 B1 * | 8/2005 | Gimlan | | B60L 8/006 |
| | | | | 320/101 |
| 7,775,118 B2 * | 8/2010 | Casey | | G01L 9/0075 |
| | | | | 361/283.4 |
| 8,118,147 B2 * | 2/2012 | Ori | | B60L 53/65 |
| | | | | 191/12.2 A |
| 8,373,068 B2 * | 2/2013 | Filippenko | | G01R 1/203 |
| | | | | 174/84 R |
| 8,926,379 B2 * | 1/2015 | Vinther | | G01R 1/06722 |
| | | | | 439/817 |
| 9,779,884 B2 * | 10/2017 | El-Kady | | H01G 11/36 |
| 10,178,760 B1 * | 1/2019 | Lee | | H05K 1/142 |
| 10,374,254 B2 * | 8/2019 | Van Berkel | | H01G 11/56 |
| 10,418,830 B1 * | 9/2019 | Parodi | | H02J 7/0042 |
| 10,586,632 B2 * | 3/2020 | Esmail | | B29C 48/05 |
| 2002/0046870 A1 * | 4/2002 | Zein | | H01B 7/0869 |
| | | | | 174/117 F |
| 2004/0053519 A1 | 3/2004 | Li et al. | | |
| 2007/0155230 A1 * | 7/2007 | Kawate | | H01R 4/2433 |
| | | | | 439/578 |
| 2007/0252556 A1 * | 11/2007 | West | | H01M 50/509 |
| | | | | 320/116 |
| 2008/0083559 A1 * | 4/2008 | Kusamitsu | | H05K 3/281 |
| | | | | 174/254 |
| 2010/0315789 A1 * | 12/2010 | Sato | | H05K 3/368 |
| | | | | 174/254 |
| 2011/0061981 A1 * | 3/2011 | Ori | | B60L 53/16 |
| | | | | 191/12.2 R |
| 2011/0232938 A1 * | 9/2011 | Kodama | | H01B 7/0838 |
| | | | | 174/117 F |
| 2012/0211319 A1 * | 8/2012 | Jacobi | | B60L 53/18 |
| | | | | 191/12.2 R |
| 2012/0322307 A1 * | 12/2012 | Kudo | | H01R 13/6592 |
| | | | | 439/607.5 |
| 2014/0085856 A1 * | 3/2014 | Shirao | | H01P 3/003 |
| | | | | 174/254 |
| 2014/0187080 A1 * | 7/2014 | Holland | | H01B 7/0838 |
| | | | | 439/502 |
| 2015/0024626 A1 * | 1/2015 | Lu | | H01R 9/0518 |
| | | | | 439/578 |
| 2015/0129013 A1 * | 5/2015 | Nositschka | | H01L 31/048 |
| | | | | 438/66 |
| 2016/0155533 A1 * | 6/2016 | Omoto | | H01R 43/28 |
| | | | | 174/128.1 |
| 2016/0204534 A1 * | 7/2016 | Ishida | | H05K 1/118 |
| | | | | 439/61 |
| 2016/0301173 A1 * | 10/2016 | Chawgo | | H01R 43/0486 |
| 2016/0308289 A1 * | 10/2016 | Kumar | | H01R 24/86 |
| 2017/0361719 A1 * | 12/2017 | Doucet | | H01B 9/006 |
| 2018/0031337 A1 * | 2/2018 | Guarrero | | C04B 28/006 |
| 2018/0294075 A1 * | 10/2018 | Esmail | | B29C 48/154 |
| 2018/0345886 A1 * | 12/2018 | Tazarine | | B60L 7/12 |
| 2019/0198837 A1 * | 6/2019 | Yushin | | H01M 50/46 |
| 2019/0356092 A1 * | 11/2019 | Huang | | H01R 24/52 |
| 2020/0028279 A1 * | 1/2020 | Hauck | | H01R 4/625 |
| 2020/0076093 A1 * | 3/2020 | Randolph | | H01R 4/188 |
| 2021/0104836 A1 * | 4/2021 | Nakamura | | H01R 13/502 |
| 2022/0329027 A1 * | 10/2022 | Becker | | H02J 7/0045 |
| 2023/0039799 A1 * | 2/2023 | Kito | | H01B 13/01254 |

\* cited by examiner

INTERNALLY SPRUNG SHUNT

CROSS-REFERENCE TO RELATED APPLICATIONS

The present application claims the benefit under 35 U.S.C. § 119(e) of U.S. Provisional Application Ser. No. 63/173,607, filed Apr. 12, 2021, and titled "INTERNALLY SPRUNG SHUNT," which is herein incorporated by reference in its entirety.

BACKGROUND

Generally, a brush is an electrical contact which conducts current between stationary wires and moving parts.

DRAWINGS

The Detailed Description is described with reference to the accompanying figures. The use of the same reference numbers in different instances in the description and the figures may indicate similar or identical items.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Figure 1:
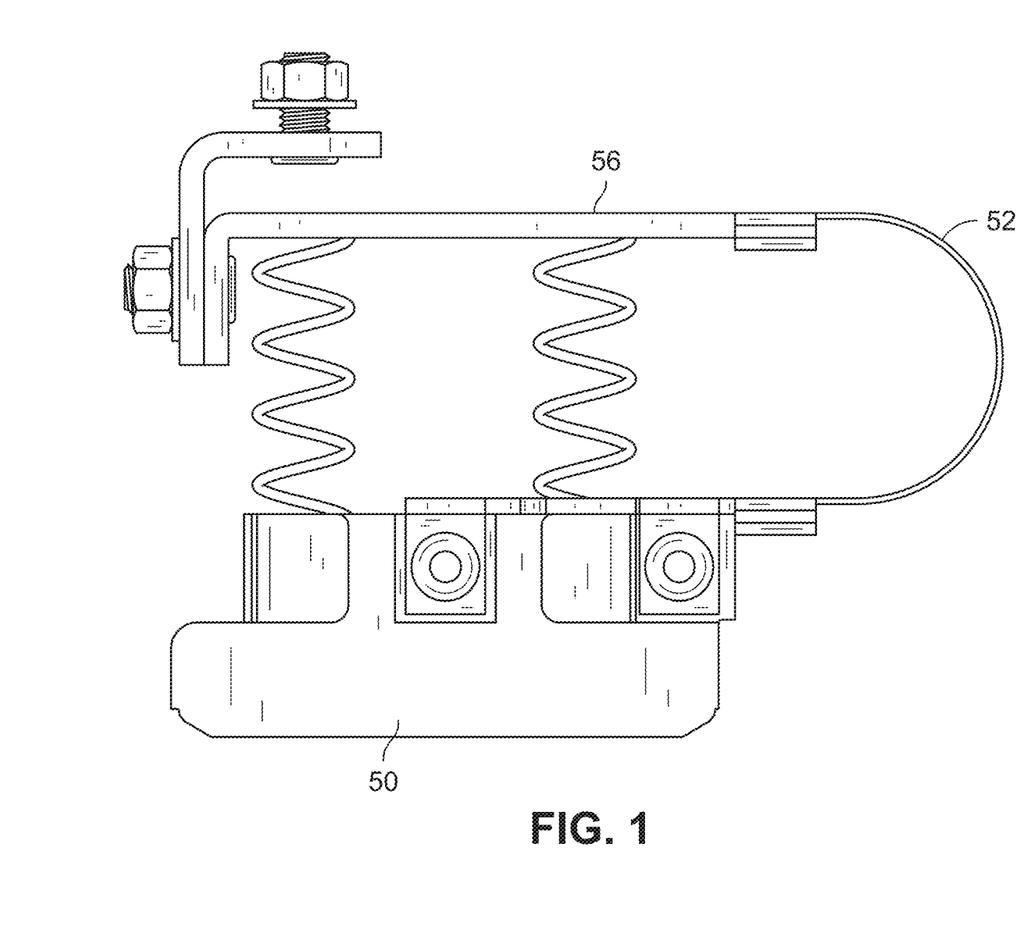
FIG. 1 is a side elevation view illustrating a charging contact assembly.
Figure 2:
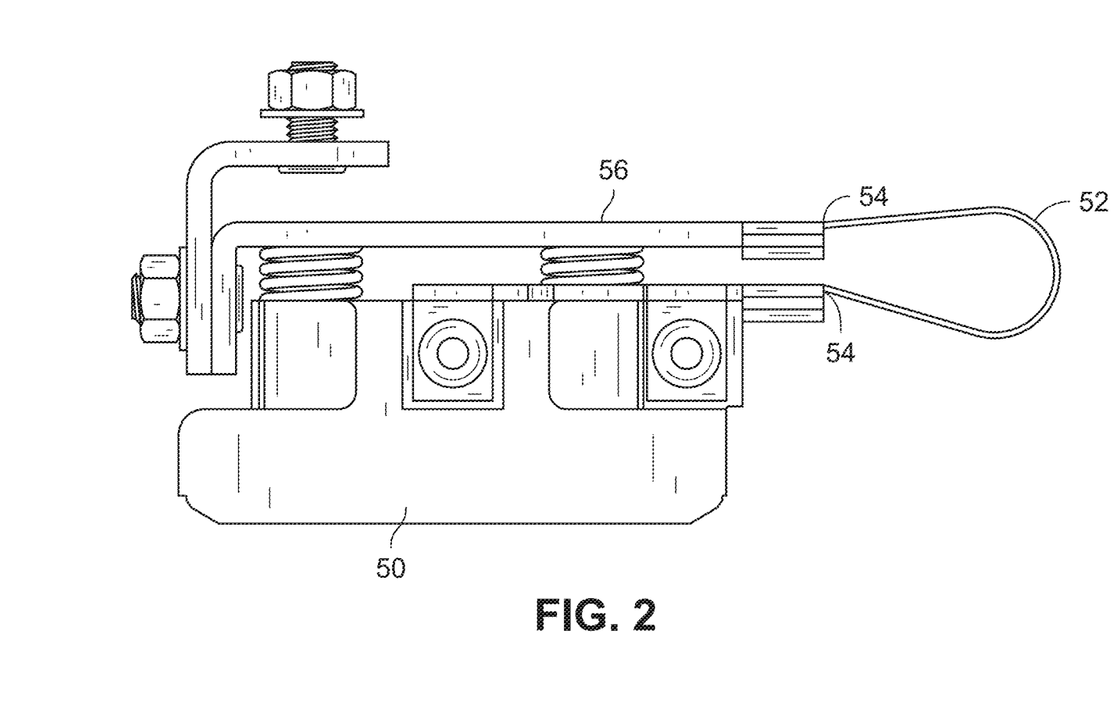
FIG. 2 is another side elevation view of the charging contact assembly illustrated in FIG. 1.

A charging base can be used for charging a battery-powered vehicle, which mounts the charging base to charge and then dismounts the charging base after charging its battery. For example, a charging base can be generally ramp-shaped, and a vehicle can have one or more contacts that are guided by the ramp shape of the charging base into contact with one or more battery charging contacts or charging brushes. The brushes can be connected to a power source, such as a supply of electrical energy. With reference to FIG. 1, the charging brushes 50 are displaced (e.g., displaced towards or away from the vehicle) when mounting and dismounting the charging base. Mesh wire shunts 52 or wires can be used to connect brushes 50 to power sources and are generally unsupported between the brush 50 and the power source. With reference to FIG. 2, these shunts 52 may have concentrated fatigue points 54 where excessive bending occurs, rather than having, for example, a controlled bend that shares the bending action with the entire shunt. For example, electrical current travels from the brush contact through a shunt 52 (wire) to a connector 56, which is generally restrained. Through brush cycling, the distance between the charge brush 50 and the connector 56 changes, and the differences in distance must be absorbed or translated by the shunt 52 (wire).

Figure 3:
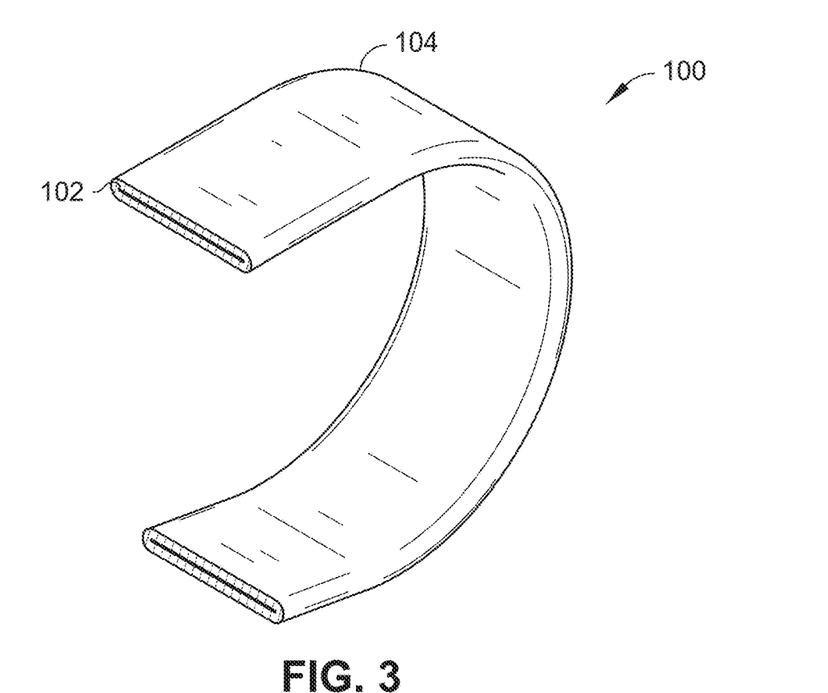
FIG. 3 is a partial cross-sectional perspective view illustrating a shunt for a charging contact assembly in accordance with example embodiments of the present disclosure.
Figure 4:
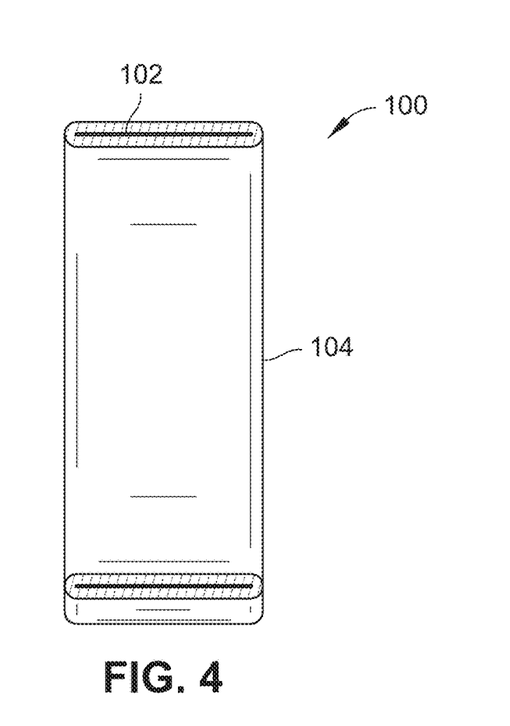
FIG. 4 is a partial cross-sectional end view of the shunt illustrated in FIG. 3.
Figure 5:
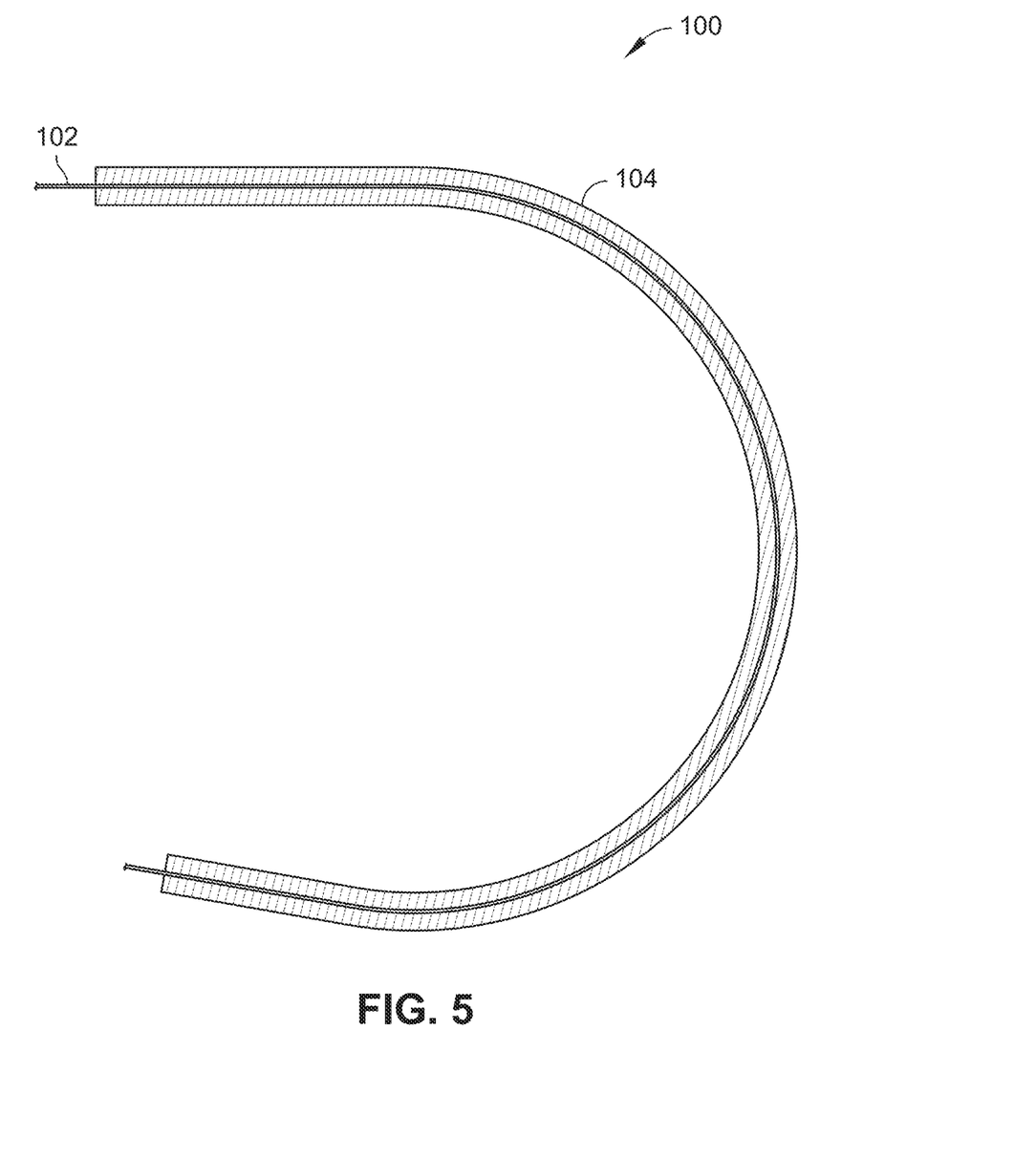
FIG. 5 is a partial cross-sectional side elevation view of the shunt illustrated in FIG. 3.

When an unsupported shunt wire is compressed or bent, the connection points to the brush and the connector tend to flex or compress more than the rest of the shunt. The excessive flexing and compression at the connection points causes the material to fatigue earlier than the rest of the shunt, leading to premature material failures, loss of electrical continuity, and so forth. Referring now to FIGS. 3 through 5, a shunt 100 can have an elongate elastic support substrate or insert 102, such as a spring steel insert, positioned within, through, and/or around the conductor 104 or shunt wire. The spring adds support for the shunt wire and forces the shunt wire to bend in a controlled manner. For example, a more rigid spring steel ribbon forces the rest of the shunt material to distribute the bending and compression forces more evenly, e.g., as the conductor 104 is comparatively weaker than the insert 102. As described herein, the internal spring supported shunt arrangement reduces shunt wear. The internal spring support can be a much stiffer material than the braided shunt material. Thus, when the shunt bends, the stiffer, centrally located internal spring support forces the surrounding mesh to compress and extend equal amounts around a neutral axis, which is defined by the internal spring. The internal spring also resists kinking and helps to distribute the stress evenly across the entire shunt. Distributing the stress allows for a reduction in concentrated flexing, and thus fatigue, in any particular part of the shunt. Less fatigue increases shunt life.

Figure 6:
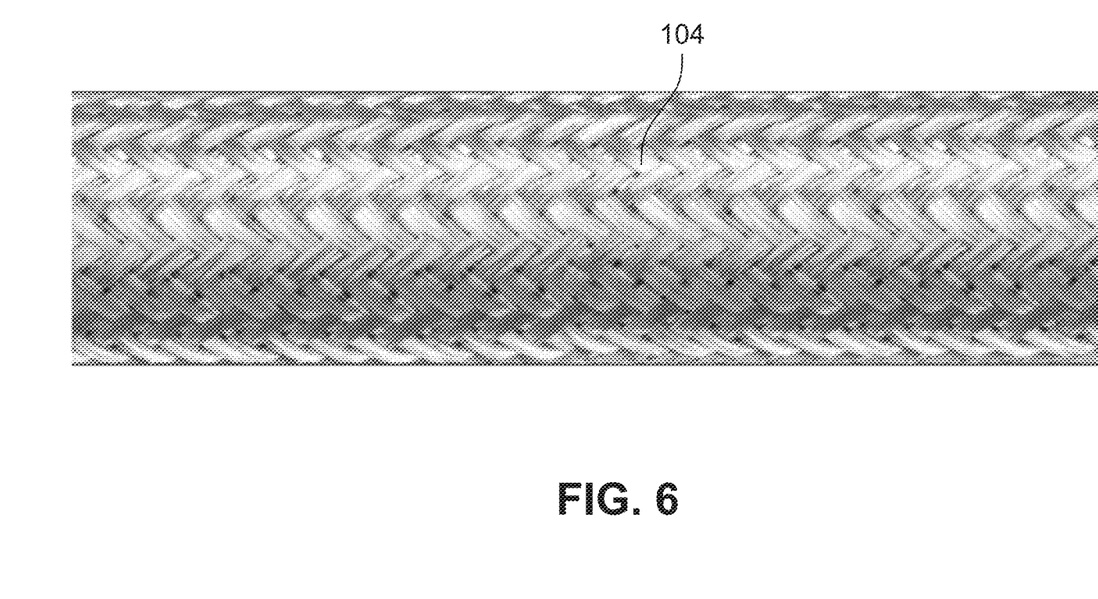
FIG. 6 is a photographic illustration of a mesh conductor for a shunt, such as the shunt illustrated in FIG. 3, where the mesh conductor is formed of tinned copper braid.

In some embodiments, the internally sprung shunt can be at least substantially flat in shape (e.g., having an elongated cross-sectional profile), with a substantially flat spring steel insert and a mesh conductor supported by the spring steel insert. In some embodiments, the insert 102 is not necessarily flat. For example, the insert 102 can be one or more spring wires (e.g., formed of non-conductive stainless steel). For instance, one or more spring wires may be woven into the mesh conductor. In some embodiments, the mesh conductor 104 can be formed of tinned copper braid (e.g., for conducting about one hundred amperes (100 A) of electrical current). With reference to FIG. 6, the tinned copper braid can be a tight weave of soft drawn tinned copper wire. The tinned copper braid can be constructed as a tube and then rolled flat to create a desired width.

However, it should be noted that the spring steel and tinned copper braid are provided by way of example and are not meant to limit the present disclosure. In other embodiments, different inserts and/or mesh conductors may be used with an internally sprung flat shunt. For instance, in some embodiments the insert 102 can be formed of various elastic materials, including, but not necessarily limited to: conductive materials, non-conductive materials, semi-conductive materials, reinforced materials (e.g., fiber reinforced materials), fiberglass materials, plastic materials, polymeric materials, beryllium copper materials, nickel alloy materials, music wire, and so forth, e.g., materials having different performance and/or cost characteristics. The conductor 104 can also be other braided materials (e.g., uncoated copper braid, braided aluminum), multi-stranded wire (e.g., a multi-strand circular conductor), and/or other conductive materials of various shapes. In some embodiments, a conductor 104 can surround, for example, a spring plate and/or wire. Additionally, in some embodiments, a conductor 104, such as a wire and/or mesh conductor, can be positioned within an external spring guide. In some embodiments, a polymer material may be bonded and/or overmolded along a shunt 100.

Figure 13:
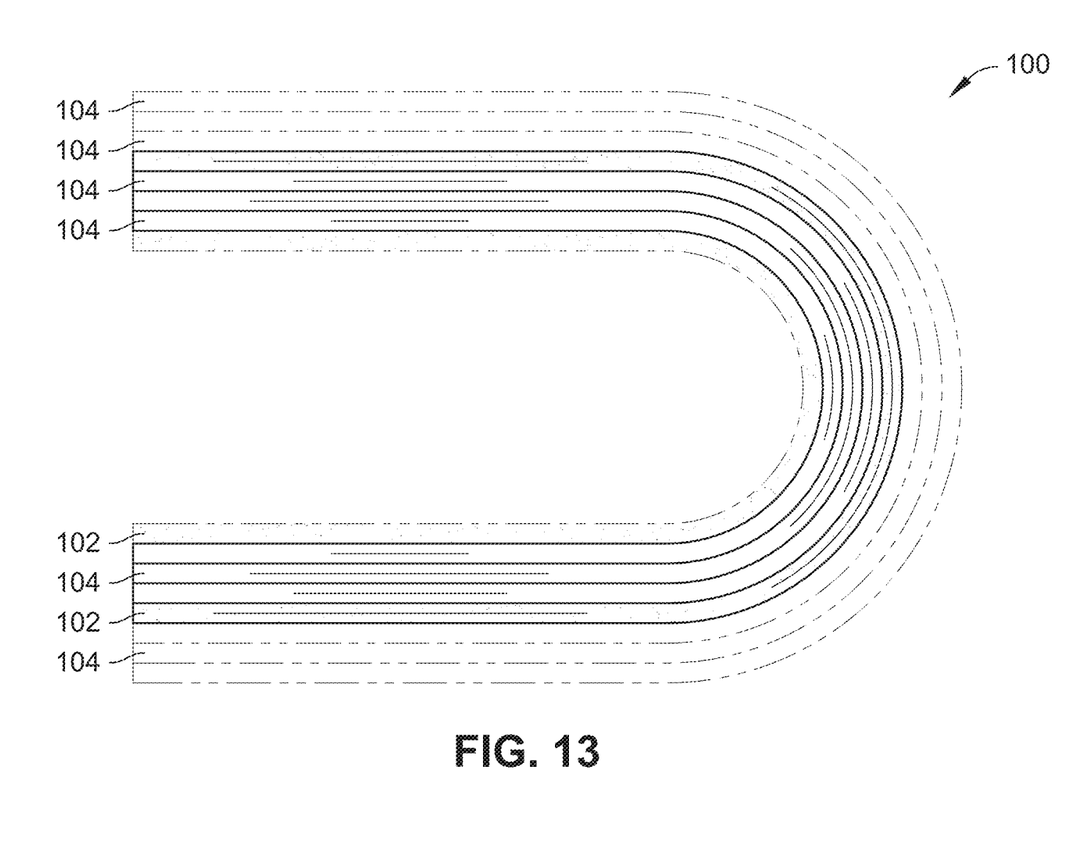
FIG. 13 is a side elevation view illustrating a shunt for a charging contact assembly in accordance with example embodiments of the present disclosure.

In some embodiments, multiple layers of spring material (e.g., more than one insert 102) may be used through, and/or around the conductor 104 or shunt wire. For example, two or more inserts 102 can be stacked together to provide greater thickness and alter the performance characteristics of a shunt 100 (e.g., instead of using a thicker single spring insert). In some embodiments, spring steel strips may be placed between alternating conductors 104. In some embodiments, a spring steel strip insert 102 may be placed on an outer radius of a stack of conductors 104, e.g., as illustrated in FIG. 13. In some embodiments, a spring steel strip insert 102 may be placed on an inside radius of a stack of conductors 104, e.g., as illustrated in FIG. 13. In some embodiments, braided conductors 104 may use dissimilar materials (e.g., metals). For example, a braid can include small gauge wire strands, where some of the strands can be replaced with a spring wire material (e.g., music wire, stainless steel, nickel alloy, beryllium copper, and so forth). In some embodiments, a braid can have a spring wire insert 102 (e.g., a round spring wire, such as a music wire, a stainless steel wire, a nickel alloy wire, a beryllium copper wire, and so on) inserted into an opening of a braided conductor 104 at various positions within the conductor 104. A spring wire insert 102 may also intersect the weave of a braided conductor 104, traveling between individual strands, e.g., without having been woven into the braided conductor 104 during its manufacture.

Figure 11:
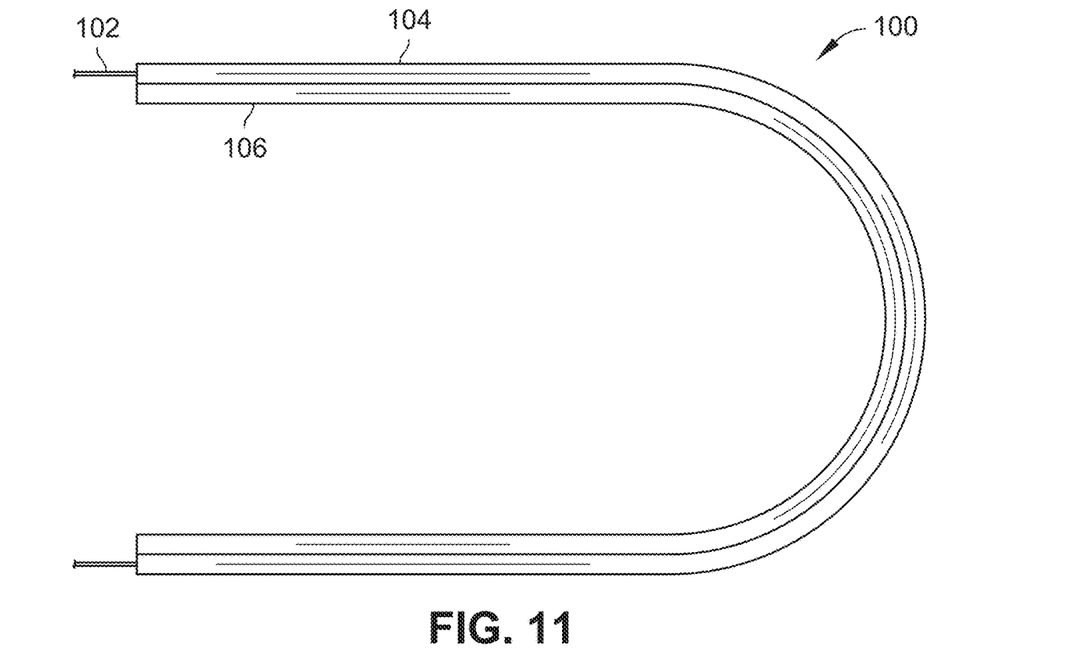
FIG. 11 is a side elevation view illustrating a shunt for a charging contact assembly in accordance with example embodiments of the present disclosure.
Figure 12:
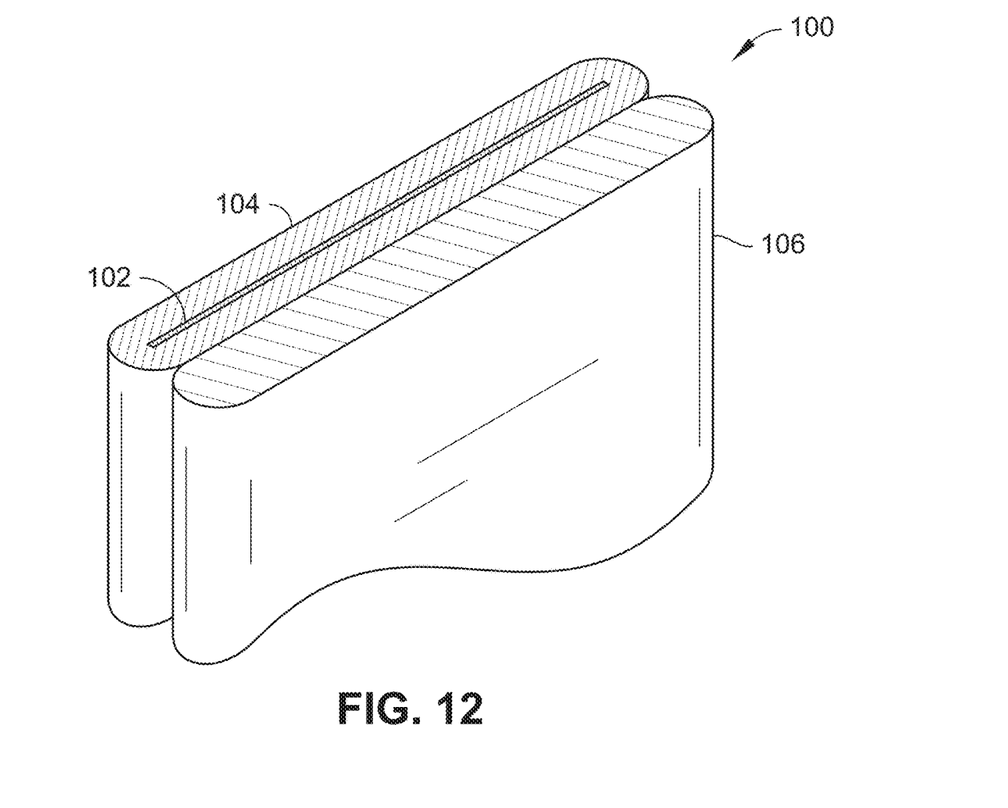
FIG. 12 is a partial cross-sectional isometric view of the shunt illustrated in FIG. 11.

With reference to FIGS. 11 and 12, a shunt 100 can have an elongate elastic support substrate or insert 102, such as a spring steel insert, positioned within, through, and/or around a first conductor 104 or shunt wire, and a second conductor 106 positioned immediately adjacent to the conductor 104 (e.g., in a stacked configuration). In this arrangement, the steel spring strip can be placed in the center of the outermost braid, which allows the steel spring to control of the movement of both braids. As described, multiple stacked conductors may be used to meet higher amperage requirements. An additional conductor 106 may or may not have an insert 102. For example, in the embodiment described with reference to FIGS. 11 and 12, the conductor 106 does not have an insert and is stacked inside of the conductor 104. In this example, the conductor 106 has a smaller radius than the conductor 104. For instance, the radius of the inner braid (conductor 106) is equal to the radius of the outer braid (conductor 104) minus the thickness of the braid and the thickness of the spring steel insert 102. Because of this relationship between radii, the length of the two conductors 104 and 106 will be different. Thus, the part stack may be pre-curved before the braid tubing is compressed (e.g., on a second end), locking the assembly together. Otherwise, if the braids are not pre-curved, outward bowing of the wires of the inner braid can occur, leading to an increase in stress and reduction in cyclic life. It should be noted that a similar result to pre-curving may be achieved by applying tension to an inner braid (e.g., conductor 106), applying compression to an outer braid (e.g., conductor 104), or a combination of tension and compression. It should also be noted that more than two conductors may be stacked together. The relationship between radii cascades when additional braids are added. For instance, the radius of the innermost braid is equal to the radius of the outmost braid minus the braid count times the braid thickness and the thickness of the spring steel insert 102, i.e., radius of innermost braid=radius of outermost braid−[(braid count*braid thickness)+steel spring strip thickness]).

Referring again to FIG. 13, a shunt 100 may be a multiple leaf shunt assembly, e.g., having a laminate construction. In some arrangements, conductors 104 in the form of thin copper sheets can be constrained by one or more elastic support inserts 102. In some embodiments, the conductors 104 may be constrained between two or more support inserts 102, while in some embodiments, the conductors 104 may be positioned along an outside of one or more support inserts 102, e.g., inside a stack of conductors 104, outside a stack of conductors 104, and so forth. Additionally, support inserts 102 may also be included between the conductors 104 to form a flexible laminate.

In some embodiments, the thin copper sheet conductors 104 can be between about two (2) one-thousandths of an inch (0.002") or about 0.0508 millimeters (mm) and about five (5) one-thousandths of an inch (0.005") or about 0.127 millimeters (mm), e.g., about 0.050 mm, 0.055 mm, 0.060 mm, 0.065 mm, 0.070 mm, 0.075 mm, 0.080 mm, 0.085 mm, 0.090 mm, 0.095 mm, 0.100 mm, 0.105 mm, 0.110 mm, 0.115 mm, 0.120 mm, 0.125 mm, 0.130 mm. In some embodiments, there can be between about two (2) and about ten (10) sheets in a stack of conductors 104, e.g., two (2) sheets, three (3) sheets, four (4) sheets, five (5) sheets, six (6) sheets, seven (7) sheets, eight (8) sheets, nine (9) sheets, ten (10) sheets, and so forth. However, these thicknesses and numbers of conductors are provided by way of example and are not meant to limit the present disclosure. In other embodiments, the conductors 104 can be less than about 0.05 mm thick, more than about 0.13 mm thick, and so forth. Additionally, more than ten (10) sheets can be included in a stack of conductors 104. The support inserts 102 may be constructed from a variety of materials, including, but not necessarily limited to: steel sheet, polymer sheet, fiberglass sheet, and so forth. The sheet conductors 104 can also be constructed from conductive materials other than copper.

In some embodiments, the insert 102 may be prestressed. For example, an insert 102 can be an elongate elastic support substrate material that is prestressed, such as a prestressed spring steel insert. In some embodiments, different lengths of material may be selected for various applications (e.g., comparatively shorter spring steel inserts, comparatively longer spring steel inserts, etc.) depending upon vibration and/or loading conditions, as well as other factors, such as degree of twist. An insert 102 can be prestressed by forming (e.g., bending) into a particular shape, such as a "U"-shape. However, a "U"-shape is provided by way of example and is not meant to limit the present disclosure. In other embodiments, an insert 102 may be pressed, bent and/or otherwise formed into other various prestressed shapes, such as a "C"-shape and so forth. In some embodiments, an insert 102 can be formed into a prestressed shape using a device such as a press break.

Referring now to FIGS. 7 through 10, charging contact assemblies 200 are described in accordance with example embodiments of the present disclosure. A charging contact assembly 200 can have a connector 202 to connect to a source of electrical energy (e.g., a power source, such as AC mains, a battery, etc.) for receiving electrical current, and a brush 204 coupled with the connector 202 for contacting a conducting surface (e.g., the contact of a battery-powered vehicle or another contact) to transfer the electrical current from the source of electrical energy through the connector 202 and the brush 204 to the conducting surface (e.g., of the battery-powered vehicle). The charging contact assembly 200 also includes a shunt 100 (e.g., as previously described) fixedly connected to the connector 202 and the brush 204 for transferring the electrical current from the connector 202 to the brush 204. The shunt 100 includes an elongate arcuate elastic support substrate (e.g., spring steel insert 102) having a first end and a second end, the first end fixedly connected to the connector 202 and the second end fixedly connected to the brush 204. The shunt 100 also includes a conductor (e.g., mesh conductor 104) disposed of the spring steel insert 102 and extending between the connector 202 and the brush 204 for transferring the electrical current between the connector 202 and the brush 204.

Figure 7:
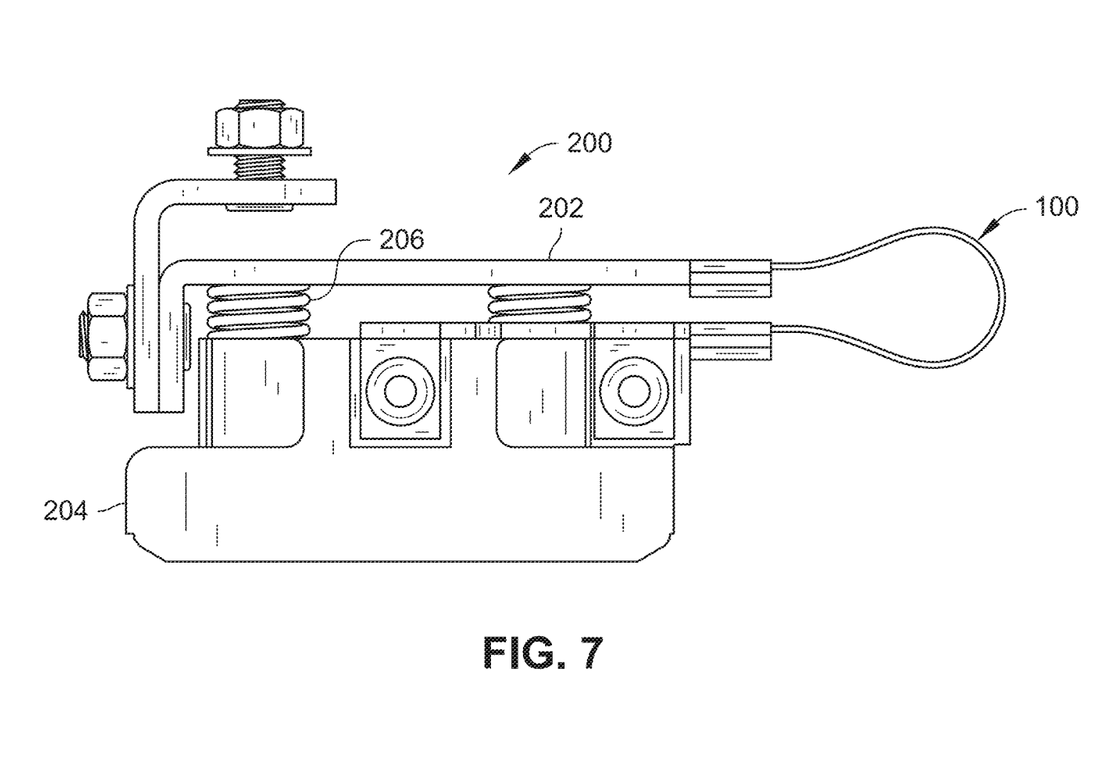
FIG. 7 is a side elevation view illustrating a charging contact assembly including a shunt in accordance with example embodiments of the present disclosure.
Figure 8:
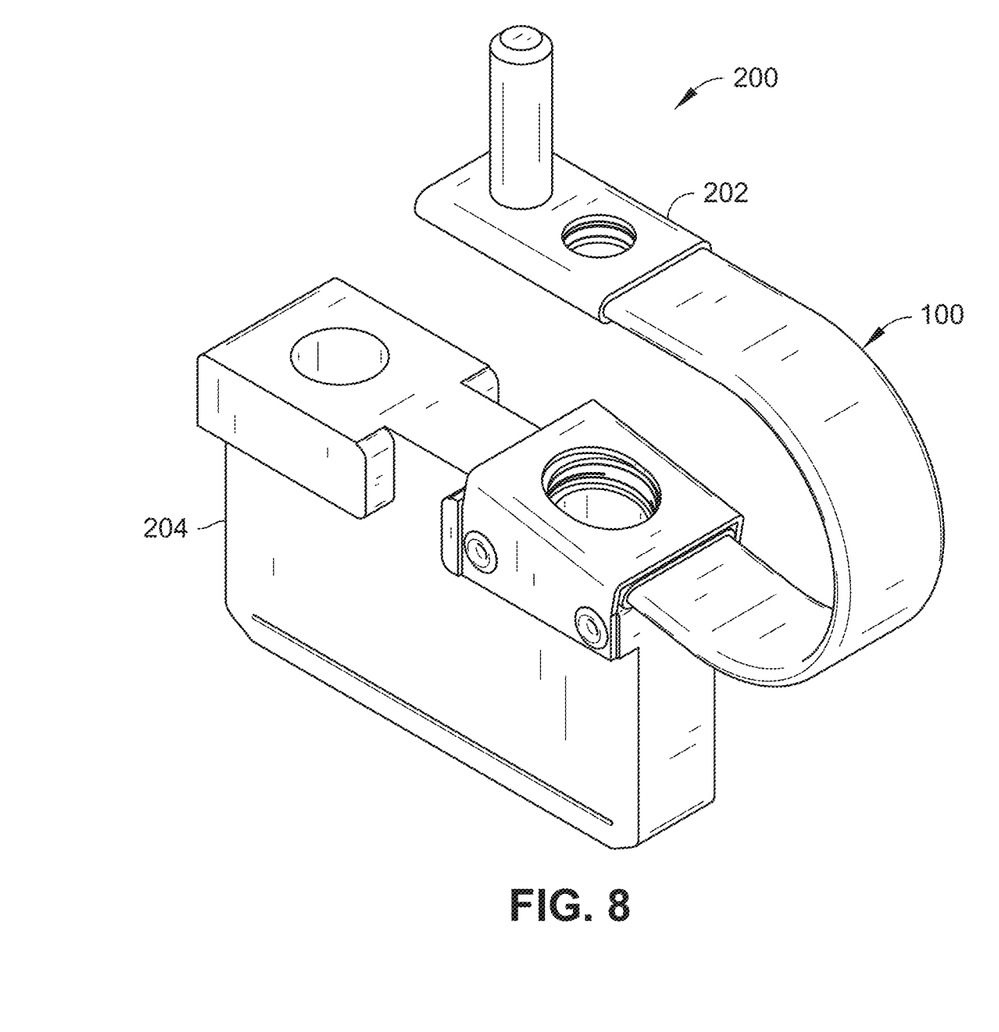
FIG. 8 is a perspective view illustrating another charging contact assembly including a shunt in accordance with example embodiments of the present disclosure.
Figure 9:
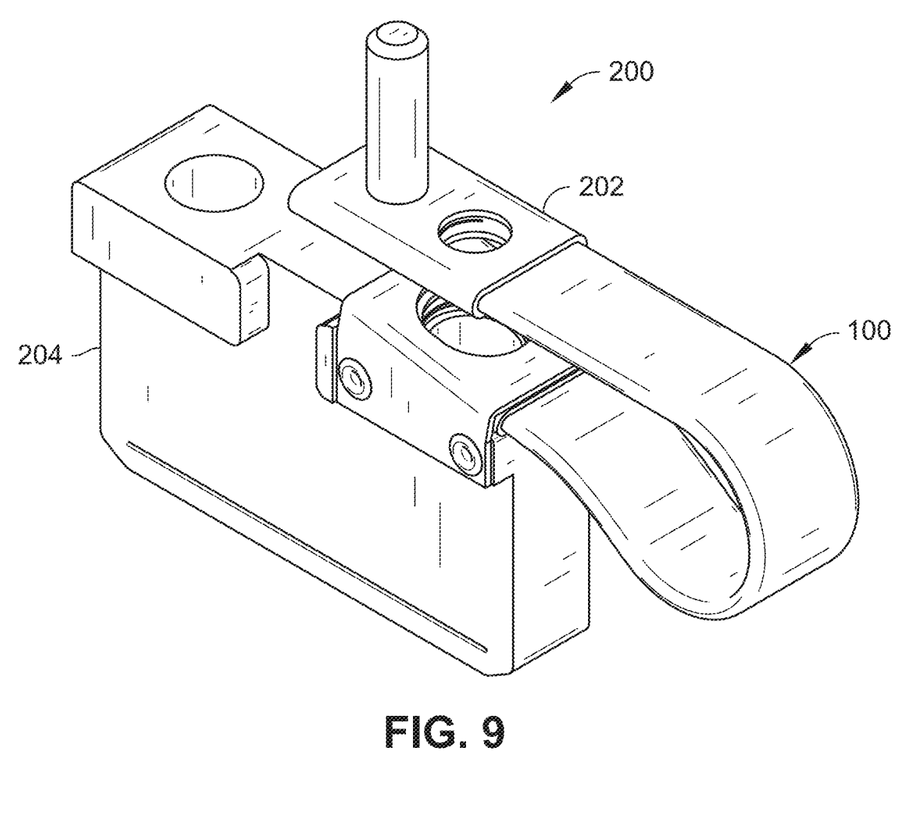
FIG. 9 is another perspective view of the charging contact assembly illustrated in FIG. 8.

In some embodiments, the first end and the second end of the insert 102 extend generally parallel to one another at respective connection points at the connector 202 and the brush 204 (e.g., as described with reference to FIG. 7). However, in other embodiments, the first end and the second end of the insert 102 may not extend generally parallel to one another at their respective connection points. For example, as described with reference to FIGS. 8 through 10, the first and second ends of the insert 102 may extend generally away from one another. For example, the second end of the insert 102 may extend at an angle of about five degrees (5°) from the horizontal, an angle of about ten degrees (10°) from the horizontal, an angle of about fifteen degrees (15°) from the horizontal, and so forth. In some embodiments, the first and second ends of the insert 102 may extend generally away from one another at an angle of up to about ninety degrees (90°) or more. In embodiments, a midpoint of the cross-section of the shunt 100 may remain generally in the same plane when in a neutral position, while motion may occur anywhere on the plane. In some embodiments, the shunt 100 may be twisted (e.g., when in a neutral position and/or when moving).

Figure 10:
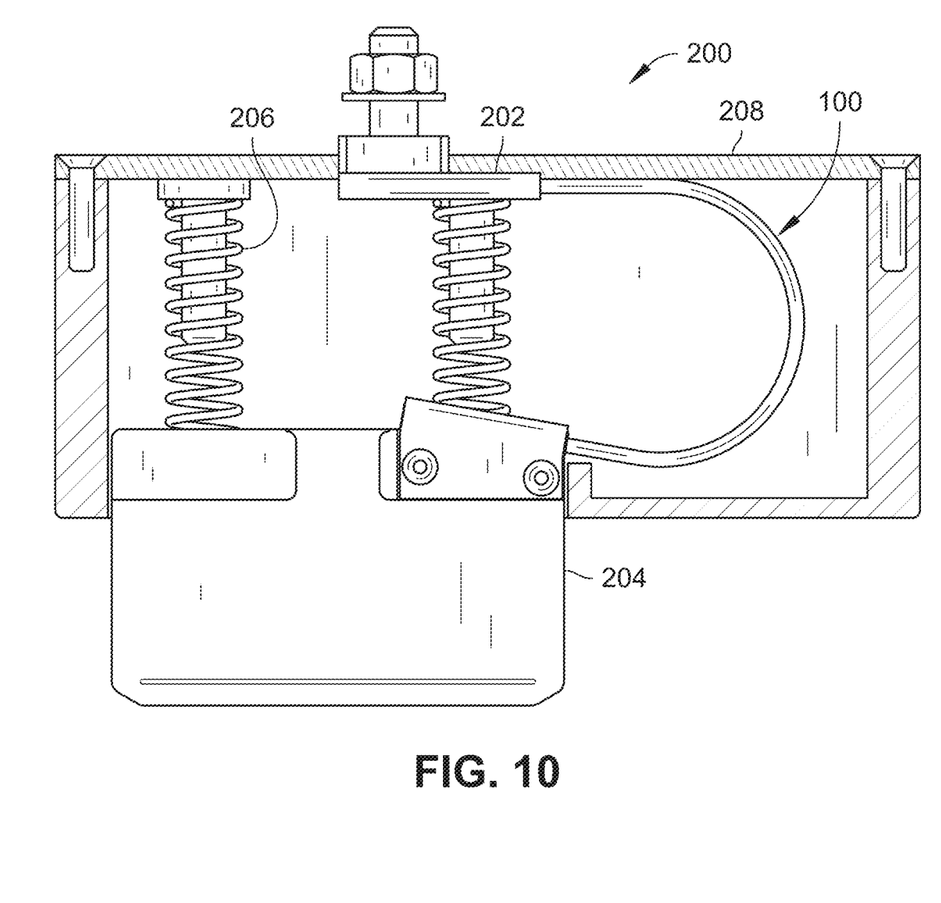
FIG. 10 is a partial cross-sectional side elevation view of a housing and the charging contact assembly illustrated in FIG. 8.

In some embodiments, the brush 204 can be biased in a direction away from the connector 202, e.g., by one or more springs 206 (e.g., coil springs) or other biasing members. Further, motion of the brush 204 with respect to the connector 202 can be constrained by a housing 208 and/or one or more other support structures for controlling the motion of the brush 204 with respect to the connector 202 (e.g., as seen in FIG. 10).

It should be noted that while charging contact assemblies have been described with some specificity, this arrangement is provided by way of example and is not meant to limit the present disclosure. In other embodiments, a shunt 100 can be used with other various connectors and/or brush arrangements subject to vibration and/or shock loading. For example, in some embodiments, a shunt 100 is included with a slip ring assembly. In this example, the shunt 100 can be connected to a brush and a connector, where the brush is biased into physical contact with a ring rotatably coupled to a holder. In another example, a shunt 100 is included with a motor brush assembly. In this example, the shunt 100 can be connected to a brush and a connector, where the brush is biased into contact with a portion of the motor to conduct electrical energy between the rotating and stationary parts of the motor (e.g., by conducting electrical current from the connector, through the shunt 100 to the brush, and then to the rotor contacted by the brush). In a further example, a shunt 100 is included with a compact collector or segmented collector shoe assembly, where multiple electrical collectors are movably positioned in a support block in a spaced-apart aligned manner. In this example, one or more shunts 100 can be connected to a common electrical bus bar attachment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A charging contact assembly comprising:
   a connector to connect to a source of electrical energy for receiving electrical current;
   a brush coupled with the connector for contacting a conducting surface to transfer the electrical current from the source of electrical energy through the connector and the brush to the conducting surface; and
   a shunt fixedly connected to the connector and the brush for transferring the electrical current from the connector to the brush, the shunt including
      a sprung elongate arcuate elastic support substrate having a first end and a second end, the first end fixedly connected to the connector and the second end fixedly connected to the brush, and
      an exposed mesh conductor disposed around the sprung elongate arcuate elastic support substrate and extending between the connector and the brush for transferring the electrical current from the connector to the brush.

2. The charging contact assembly as recited in claim 1, wherein the sprung elongate arcuate elastic support substrate comprises at least one of a flat spring steel insert, a spring steel wire insert, a fiberglass insert, a polymeric insert, or a beryllium copper insert.

3. The charging contact assembly as recited in claim 1, wherein the mesh conductor comprises at least one of a tinned copper braid, an uncoated copper braid, a braided aluminum, or a multi-strand circular conductor material.

4. A shunt for a charging contact assembly, the shunt comprising:
   a sprung elongate elastic support substrate formed of spring steel; and
   an exposed mesh conductor disposed around the sprung elongate elastic support substrate for transferring electrical current.

5. The shunt as recited in claim 4, wherein the sprung elongate elastic support substrate is woven into the mesh conductor.

6. The shunt as recited in claim 4, wherein the mesh conductor comprises at least one of a tinned copper braid, an uncoated copper braid, a braided aluminum, or a multi-strand circular conductor material.

7. A charging contact assembly comprising:
a connector to connect to a source of electrical energy for receiving electrical current;
a brush coupled with the connector for contacting a conducting surface to transfer the electrical current from the source of electrical energy through the connector and the brush to the conducting surface; and
a shunt fixedly connected to the connector and the brush for transferring the electrical current from the connector to the brush, the shunt including
a sprung elongate arcuate elastic support substrate having a first end and a second end, the first end fixedly connected to the connector and the second end fixedly connected to the brush, and
an exposed conductor disposed around the sprung elongate arcuate elastic support substrate and extending between the connector and the brush for transferring the electrical current from the connector to the brush.

8. The charging contact assembly as recited in claim 7, wherein the conductor comprises a mesh conductor.

9. The charging contact assembly as recited in claim 7, wherein the conductor comprises a mesh conductor, and the sprung elongate arcuate elastic support substrate is woven into the mesh conductor.

10. The charging contact assembly as recited in claim 7, wherein the first end and the second end of the sprung elongate arcuate elastic support substrate extend generally parallel to one another at respective connection points at the connector and the brush.

11. The charging contact assembly as recited in claim 7, wherein the first end and the second end of the sprung elongate arcuate elastic support substrate extend at angles with respect to one another at respective connection points at the connector and the brush.

12. The charging contact assembly as recited in claim 7, wherein the sprung elongate arcuate elastic support substrate comprises at least one of a flat spring steel insert, a spring steel wire insert, a fiberglass insert, a polymeric insert, or a beryllium copper insert.

13. The charging contact assembly as recited in claim 7, wherein the conductor comprises a mesh conductor, and the mesh conductor comprises at least one of a tinned copper braid, an uncoated copper braid, a braided aluminum, or a multi-strand circular conductor material.

14. The charging contact assembly as recited in claim 7, wherein the conductor comprises a plurality of conductive sheets, and the sprung elongate arcuate elastic support substrate comprises one or more sheets of support material disposed on at least one of an inside of the plurality of conductive sheets, an outside of the plurality of conductive sheets, or between adjacent ones of the plurality of conductive sheets to form a laminate.

* * * * *